United States Patent
Lee et al.

(10) Patent No.: US 8,520,137 B2
(45) Date of Patent: Aug. 27, 2013

(54) WAFER-LEVEL LENS MODULE AND IMAGE PICKUP DEVICE INCLUDING THE SAME

(75) Inventors: Eun-sung Lee, Hwaseong-si (KR); Min-seog Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 259 days.

(21) Appl. No.: 12/724,899

(22) Filed: Mar. 16, 2010

(65) Prior Publication Data
US 2011/0037887 A1  Feb. 17, 2011

(30) Foreign Application Priority Data
Aug. 13, 2009 (KR) .................. 10-2009-0074860

(51) Int. Cl.
*H04N 5/225* (2006.01)
*G02B 13/16* (2006.01)

(52) U.S. Cl.
USPC ............ 348/374; 348/335; 348/340; 257/432

(58) Field of Classification Search
USPC .................. 348/335, 340, E05.024, 373, 374
See application file for complete search history.

(56) References Cited

U.S. PATENT DOCUMENTS

| | | | |
|---|---|---|---|
| 5,880,879 A | 3/1999 | Foo | |
| 6,618,201 B2 | 9/2003 | Nishikawa et al. | |
| 6,850,368 B2 | 2/2005 | Shimizu et al. | |
| 6,933,584 B2 * | 8/2005 | Miyazaki et al. | 257/432 |
| 6,949,808 B2 | 9/2005 | Harazono | |
| 7,019,375 B2 | 3/2006 | Harazono | |
| 7,042,645 B2 | 5/2006 | Houlihan et al. | |
| 7,336,430 B2 | 2/2008 | George et al. | |
| 7,391,458 B2 * | 6/2008 | Sakamoto | 348/340 |
| 7,525,732 B2 | 4/2009 | Uehara et al. | |
| 7,633,544 B2 | 12/2009 | Woo et al. | |
| 7,817,359 B2 | 10/2010 | Tsai | |
| 2003/0090987 A1 | 5/2003 | Kitahara et al. | |

(Continued)

FOREIGN PATENT DOCUMENTS

| | | |
|---|---|---|
| EP | 1 413 900 A2 | 4/2004 |
| EP | 1 443 754 A2 | 8/2004 |

(Continued)

OTHER PUBLICATIONS

Office Action issued Feb. 11, 2011 in co-pending U.S. Appl. No. 12/537,283.

(Continued)

*Primary Examiner* — Hung Lam
(74) *Attorney, Agent, or Firm* — Sughrue Mion, PLLC

(57) ABSTRACT

Disclosed are a wafer-level lens module including a plurality of wafer-scale lenses that are stacked and an image pickup device including the wafer-level lens module and an image sensor. Each wafer-scale lens includes a substrate with a light-transmission part, and a lens element fixed on one side or both sides of the substrate. The lens element includes an optical zone, corresponding to the light-transmission part of the substrate, and an extended zone disposed outside the optical zone. A trench or protrusion is formed as an alignment guide on one or both sides of the substrate, adjacent to the light-transmission part, and a protrusion or trench, aligned with the trench or protrusion, is formed in the extended zone of the lens element. The lens element is aligned on the substrate such that an inclined portion of the protrusion contacts corners of the trench.

24 Claims, 10 Drawing Sheets

(56) References Cited

U.S. PATENT DOCUMENTS

| | | |
|---|---|---|
| 2003/0157211 A1 | 8/2003 | Tsunetomo et al. |
| 2004/0090571 A1* | 5/2004 | Fujita .............................. 349/95 |
| 2005/0074702 A1 | 4/2005 | Lee et al. |
| 2005/0271375 A1 | 12/2005 | Watanabe et al. |
| 2006/0126180 A1 | 6/2006 | Jung et al. |
| 2007/0046862 A1 | 3/2007 | Umebayashi et al. |
| 2008/0100934 A1* | 5/2008 | Webster et al. ............... 359/830 |
| 2008/0112059 A1* | 5/2008 | Choi et al. .................... 359/664 |
| 2008/0121784 A1 | 5/2008 | Chang et al. |
| 2008/0123199 A1 | 5/2008 | Hong |
| 2010/0050412 A1* | 3/2010 | Lee et al. ....................... 29/428 |
| 2010/0142061 A1* | 6/2010 | Choi et al. .................... 359/793 |

FOREIGN PATENT DOCUMENTS

| | | | |
|---|---|---|---|
| JP | 2000-66097 A | 3/2000 | |
| JP | 2000-301550 A | 10/2000 | |
| JP | 2001-83414 A | 3/2001 | |
| JP | 2003-86779 A | 3/2003 | |
| JP | 2003-140036 A | 5/2003 | |
| JP | 2003-179217 A | 6/2003 | |
| JP | 2003-211462 A | 7/2003 | |
| JP | 2004-40287 A | 2/2004 | |
| JP | 2004-61623 A | 2/2004 | |
| JP | 2004-163695 A | 6/2004 | |
| JP | 2005-333170 A | 12/2005 | |
| JP | 2006-45029 A | 2/2006 | |
| JP | 2007-025297 A | 2/2007 | |
| JP | 2007-65126 A | 3/2007 | |
| JP | 2008-129606 A | 6/2008 | |
| KR | 10-2005-0010343 A | 1/2005 | |
| KR | 10-2005-0033987 A | 4/2005 | |
| KR | 10-2005-0064560 A | 6/2005 | |
| KR | 10-2006-0070813 A | 6/2006 | |
| KR | 10-0647299 B1 | 11/2006 | |
| KR | 10-0691268 B1 | 3/2007 | |
| KR | 10-2008-0072333 A | 8/2008 | |
| KR | 10-2008-0099031 A | 11/2008 | |
| KR | 10-2009-0037684 A | 4/2009 | |
| WO | 2005/008780 A1 | 1/2005 | |
| WO | 2008/011003 A2 | 1/2008 | |
| WO | 2008/133946 A1 | 11/2008 | |

OTHER PUBLICATIONS

Office Action issued May 19, 2011 in co-pending U.S. Appl. No. 12/537,283.

Kolodziejczyk, A. et al., "The light sword optical element—a new diffraction structure with extended depth of focus", Journal of Modern Optics, 1990, pp. 1283-1286, vol. 27, No. 8.

Mikula, G. et al., "Imaging with extended focal depth by means of lenses with radial and angular modulation", Optics Express, Jul. 2007, pp. 9184-9193, vol. 15, No. 15.

Mikula, G. et al., "Diffractive elements for imaging with extended depth of focus", Optical Engineering, May 2005, pp. 058001-1-058001-7, vol. 44, No. 5.

Davidson, N. et al., "Holographic axilens: high resolution and long focal depth", Optical Society of America, 1991, pp. 523-525, vol. 16, No. 7.

Extended European Search Report issued Jul. 29, 2010 in counterpart European Application No. 10160047.6.

\* cited by examiner

WAFER-LEVEL LENS MODULE AND IMAGE PICKUP DEVICE INCLUDING THE SAME

CROSS-REFERENCE TO RELATED APPLICATION

This application claims priority from Korean Patent Application No. 10-2009-74860, filed on Aug. 13, 2009, the disclosure of which is incorporated by reference in its entirety for all purposes.

BACKGROUND

1. Field

The following description relates to an image pickup device, and more particularly, to an image pickup device and a lens module included in the same.

2. Description of the Related Art

Following the development of digital technologies, digital convergence is becoming increasingly popular. Applications of digital convergence are most active in the field of media and communications. A representative digital convergence product is a so-called "camera phone" where an image pickup module such as a digital camera or a digital camcorder is combined with a mobile phone. Image pickup modules such as digital cameras and the like are installed in various mobile electronic devices including laptop computers and Personal Digital Assistants (PDAs) in addition to mobile phones.

As mobile electronic devices with image pickup modules are small and slimline, and are becoming more popular, demands for small, light-weight and low-cost image pickup modules are increasing accordingly. Particularly, in order to keep pace with the recent trend in which various electronic devices, such as MP3 players, Portable Multimedia Players (PMP), Digital Multimedia Broadcasting (DMB) television reception devices, etc., in addition to image pickup modules are integrated into camera phones, the demands for small, low-cost image pickup modules are further increasing.

In order to meet these demands, a wafer-level image pickup module has been developed. A related art lens module (hereinafter, referred to as a wafer-level lens module) for a wafer-level image pickup module has a stacked structure of transparent substrates and polymer lenses. The wafer-level lens module is manufactured by arranging and stacking a plurality of transparent wafers, each having polymer lenses formed in an array using a replica method, and then cutting them. Accordingly, the wafer-level lens module can be manufactured to be small and light-weight at low cost, which allows for mass production.

A related art wafer-level lens, which is manufactured by the replica method, is made of mainly UV curable polymer. In the case of manufacturing a wafer-level lens using UV curable polymer, the manufacturing process is simplified, which leads to a reduction in manufacturing costs. However, there are difficulties in applying such a wafer-level lens module including polymer lenses to 5 Mega pixel or higher resolution cameras. The reason is polymer lenses are easily distorted with respect to shape and exhibit high chromatic aberration.

When camera phones were first introduced, consumer expectations regarding the quality and performance of the camera installed therein were not high. However, recently, as the types of mobile phones have become more varied to satisfy the various demands or tastes of consumers, the demand on resolution of a camera module installed in a camera phone also is becoming higher. In particular, mobile devices with 5 Mega pixel or higher resolution cameras have become widespread, and furthermore such mobile devices are becoming increasingly small and slimline. In order to keep pace with this recent trend, a need for a wafer-level image pickup apparatus that can be used in various applications and supports high performance is increasing.

SUMMARY

The following description relates to an image pickup device for a small-sized, thin mobile electronic apparatus, and a wafer lens module used in the image pickup device.

According to one aspect, there is provided an image pickup device including an image sensor and a wafer-level lens module. The wafer-level lens module includes a plurality of wafer-scale lenses that are stacked. Each wafer-scale lens includes a substrate and a lens element fixed on one side or both sides of the substrate. The substrate has a light-transmission part through which light passes, and in one side of the substrate, a trench or protrusion as an alignment guide is formed adjacent to the light-transmission part. The lens element includes an optical zone positioned aligned with the light-transmission part of the substrate, an extended zone extending disposed outside the optical zone, and a protrusion or trench disposed in the extended zone. In the wafer-scale lens, the protrusion is aligned with the trench such that inclined portion of the protrusion contacts corners of the trench, so that the lens element is aligned and fixed at an exact location on the one side of the substrate.

In another aspect, there is provided an image pickup device including an image sensor and a wafer-level lens module. The wafer-level lens module includes at least two wafer-scale lenses spaced a predetermined distance from each other, and each wafer-scale lens includes a substrate and a lens element formed disposed on one side or both sides of the substrate. Each substrate includes a light-transmission part through which light passes, and a trench or protrusion formed adjacent to the light-transmission part. Each lens element includes an optical zone aligned with the light-transmission part of the substrate, an extended zone disposed outside the optical zone, and a protrusion or trench disposed in the extended zone. The lens element is aligned on one side of the substrate such that the protrusion of the lens element or substrate is inserted into and fixed at the trench of the substrate or lens element.

In another aspect, there is provided an image pickup device including an image sensor and a wafer-level lens module. The wafer-level lens module includes at least two substrates and at least three lens elements. The first substrate of the two substrates includes a first through hole, a first trench disposed on a first side of the substrate adjacent to the first through hole, and a second trench disposed on a second side of the substrate, opposite the first side, adjacent to the first through hole. The first lens element may be fixed on the first side of the first substrate and the second lens element may be fixed on the second side of the first substrate. The first lens element, which is disposed on the first substrate, includes a first optical zone aligned with the first through hole, a first extended zone disposed outside the first optical zone, and a protrusion disposed in the extended zone. An inclined portion of the protrusion of the first lens element contacts corners of the first trench so that the protrusion is aligned with and fixed at the first trench. The second lens element, which is disposed on the second side of the first substrate, includes a second optical zone aligned with the first through hole, a second extended zone disposed outside the second optical zone, and a protrusion disposed in the second extended zone. An inclined portion of the protrusion of the second lens element contacts corners of the second trench so that the protrusion is aligned to and fixed at the second trench. The second substrate includes a second through hole and a third trench disposed in a first side of the second substrate adjacent to an edge portion of the second through hole. On the second substrate, a third lens element is fixed. The third lens element includes a third optical zone aligned with the second through hole, a third extended zone disposed outside the third optical zone, and a protrusion disposed in the third extended zone. The third lens element is disposed on the second substrate such that an inclined portion of the protrusion of the third lens element contacts and is fixed to corners of the third trench.

Other objects, features and advantages will be apparent from the following description, the drawings, and the claims.

BRIEF DESCRIPTION OF THE DRAWINGS

These and/or other aspects will become apparent and more readily appreciated from the following description of embodiments, taken in conjunction with the accompanying drawings of which.

Elements, features, and structures are denoted by the same reference numerals throughout the drawings and the detailed description, and the size and proportions of some elements may be exaggerated in the drawings for clarity and convenience.

DETAILED DESCRIPTION

The detailed description is provided to assist the reader in gaining a comprehensive understanding of the methods, apparatuses and/or systems described herein. Various changes, modifications, and equivalents of the systems, apparatuses, and/or methods described herein will likely suggest themselves to those of ordinary skill in the art. Also, descriptions of well-known functions and constructions are omitted to increase clarity and conciseness.

A wafer-level mobile image pickup device is generally installed in a mobile electronic device such as a camera phone and the like. The wafer-level image pickup device includes an image sensor and a wafer-level lens module in which a plurality of wafer-scale lenses are stacked. Each wafer-scale lens includes a substrate with a light-transmission part and one or more lens elements attached on one or both sides of the substrate.

One consideration in making a wafer-level image pickup device able to support high resolutions is the precise alignment of the stacked lens elements. Here, the alignment of lens elements includes "positional alignment" relating to the positions of the stacked lens elements, "horizontal alignment" relating to tilting of each lens element fixed on a substrate and "vertical alignment" relating to the heights of lens elements assembled on the substrate. If an alignment error occurs in a certain lens element, the alignment error may be amplified due to the stacked structure of lens elements on an optical path and such an amplified error acts as a factor preventing accurate imaging by the image sensor. That is, alignment errors are serious obstacles in improving the resolution of an image pickup device and also act as a factor in the deteriorating performance of an image pickup device. For this reason, a wafer-level image pickup device has to satisfy very specific criteria with respect to positional, horizontal and vertical alignment of lens elements.

Figure 1:
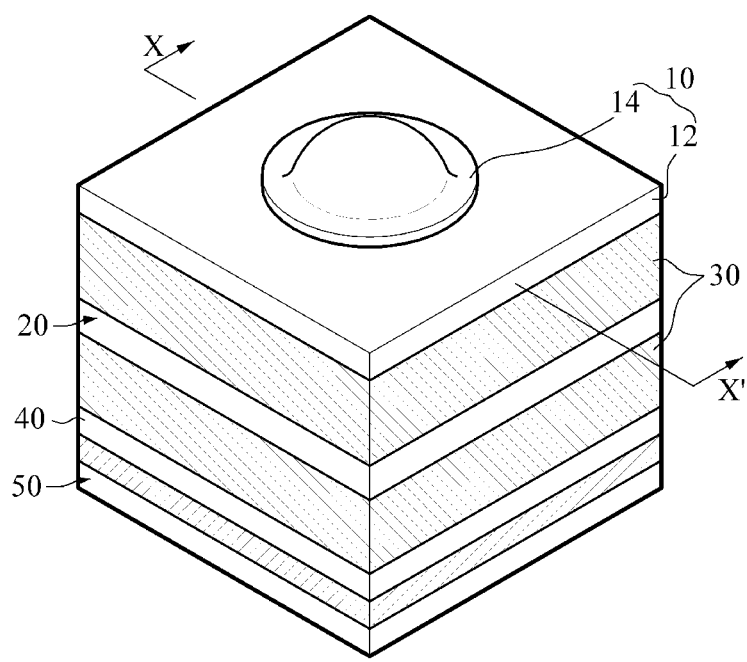
FIG. 1 is a perspective view showing an wafer-level image pickup device.

FIG. 1 is a perspective view showing an wafer-level image pickup device. The wafer-level image pickup device includes a wafer-level lens module (including elements 10, 20, 30), and an image sensor module 50. In FIG. 1, elements forming the image pickup device are exaggerated in size, shape, thickness, etc. for clarity. Also, the number of wafer-scale lenses (10, 20) included in the image pickup device is merely illustrative.

Referring to FIG. 1, the wafer-level lens module of the image pickup device includes two wafer-scale lenses 10 and 20 and a spacer 30 for spacing the wafer-scale lenses 10 and 20 a predetermined distance from each other. In the lowest portion of the image pickup device, the image sensor module 50 is disposed, and a glass cover 40 may be provided over the image sensor module 50 as necessary. The glass cover 40 and the wafer-scale lens 20 also may be spaced a predetermined distance from each other by way of another spacer 30.

The image pickup device may be a rectangular parallelepiped. In this case, each of the wafer-scale lenses 10 and 20 forming the wafer-level lens module may have a cuboidal shape, unlike the shape of a general lens. The wafer-scale lenses 10 and 20 having a substantially quadrangle shape are spaced a predetermined distance by the spacer 30 that is formed along the edge portions of the wafer-scale lenses 10 and 20. Varying the height of the spacer 30 will change the distance between the wafer-scale lenses 10 and 20. The image sensor module 50, which forms a predetermined image by receiving incident light passing through the wafer-scale lenses 10 and 20, also has a substantially quadrangle shape.

The substantially rectangular parallelepiped shape of the wafer-level lens module relates to a method of manufacturing the image pickup device according to the current embodiment. In more detail, in order to manufacture the image pickup device, first, lens elements are arranged and fixed on one side or both sides of each of wafers, which are partitioned into an array of quadrangle substrates. Utilizing structural interrelationships between protrusions or trenches of the lens elements and trenches or protrusions of the substrates, along with utilizing contacts between the inclined portions of the protrusions and the corners of the trenches, facilitates alignment of the lens elements on the substrates and horizontal-positioning and fixing at exact locations of the lens elements, which will be described later in more detail. As a result of the alignment and fixing, the wafer-scale lenses 10 and 20 are made having lens elements are arranged in an array on one side or both sides of each wafer.

Then, the wafer-scale lenses 10 and 20 are spaced a predetermined distance apart. For spacing the wafer-scale lenses 10 and 20 apart from each other, the spacer 30 is applied on the wafer-scale lens 20. Specifically, the spacer 30 is disposed along the edge portion of the substrate of the wafer-scale lens 20. Also, along the edge portion of the glass cover 40, another spacer 30 may be disposed to space the wafer-scale lens 20 a predetermined distance from the image sensor module 50. According to an embodiment, grooves are engraved in the edge portions of the substrate and/or glass cover 40 or in the spacers 30, and adhesive is filled in each groove by an amount less than the volume of the groove to bind the wafer-scale lens 10 and 20 and/or glass cover 40 with the spacers 30. In this way, accurate vertical alignment between the wafer-scale lenses 10 and 20 and the image sensor module 50 may be achieved.

Thereafter, by dicing the stacked structure of the image sensor module 50, the glass cover 40 and the wafer-scale lenses 10 and 20 along the spacers 30, the image pickup device including the image sensor module 50 and the wafer-level lens module (10, 20, 30) may be finally manufactured. Through this manufacturing method, a small-sized, thin wafer-level image pickup device may be manufactured at low cost. In addition, the wafer-level image pickup device may improve accuracy in positional, horizontal and/or vertical alignment.

Figure 2:
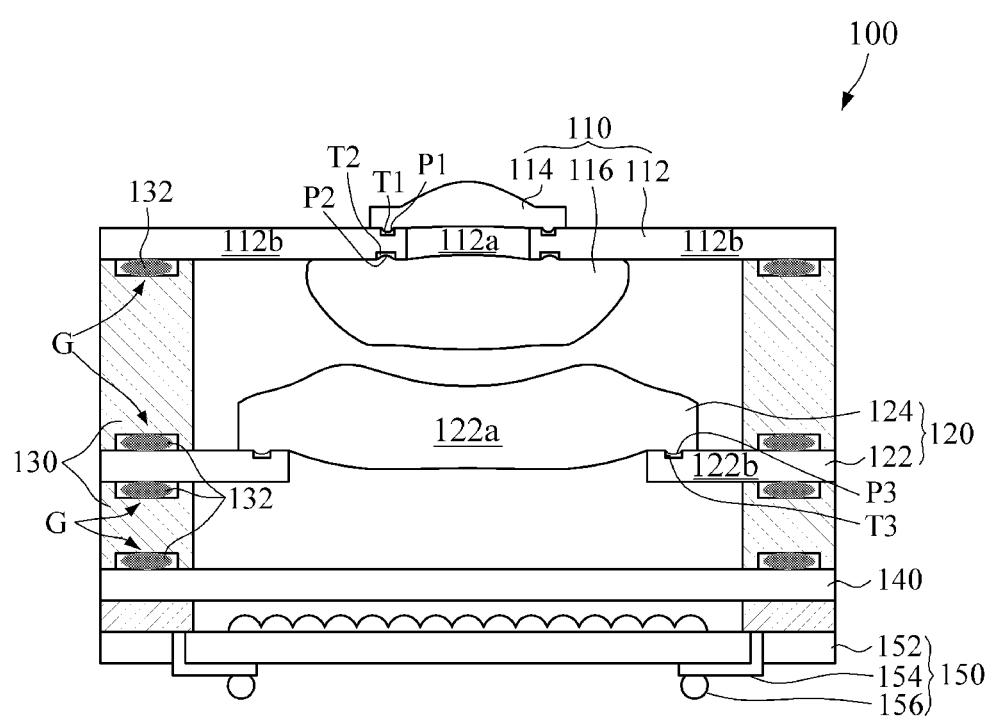
FIG. 2 is a cross-sectional view of the wafer-level image pickup device cut along a line X-X' of FIG. 1, according to an embodiment.

FIG. 2 is a cross-sectional view of the wafer-level image pickup device cut along a line X-X' of FIG. 1, according to an embodiment. Referring to FIG. 2, the image pickup device includes a plurality of wafer-scale lenses 110 and 120, spacers 130, and an image sensor 150.

The image sensor 150 includes a photosensitive element array which forms images by receiving light through the wafer-scale lenses 110 and 120. The image sensor 150 may be a Complementary Metal-Oxide Semiconductor (CMOS) image sensor or a Charge Coupled Device (CCD), however, is not limited to these. T0 the image pickup module illustrated in FIG. 2 is applied, for example, a wafer-scale package. In the wafer-scale package, a solder ball 156 is formed below a photosensitive element array substrate 152 on which the photosensitive element array is formed, and is electrically connected to the photosensitive element array via a through via 154 that penetrates the substrate 152.

Over the photosensitive element array, a glass cover 140 is disposed to be spaced a predetermined distance from and bonded with the photosensitive element array substrate 152. The glass cover 140 functions to protect the photosensitive element array. Above or below the glass cover 140, an optical coating layer, such as an optical low-pass filter, a color difference filter or an IR filter, may be provided.

The wafer-scale lenses 110 and 120 are spaced a predetermined distance apart from each other by the spacers 130. The spacers 130 are used to maintain the intervals between the wafer-scale lenses 110 and 120 and between the wafer-scale lens 120 and the image sensor 150 (in more detail, between the wafer-scale lens 120 and the glass cover 140). The size and thickness of each spacer 130 may depend on the shapes or thicknesses of individual lens elements 114, 116 and 124. In the current embodiment, the sizes, etc. of the spacers 130 are not limited, but it is notable that the spacers 130 may be formed along the edge portions of the wafer-scale lenses 110 and 120 having a quadrangle shape, specifically, along the edge portions of substrates 112 and 122 and the glass cover 140.

The substrates 112 and 122 and/or the glass cover 140 may be bonded with the spacers 130 by use of adhesive. However, in the case where adhesive is interposed into the interfaces between the substrates (112, 122) and the spacers 130 and/or between the glass cover 140 and the spacers 130, the vertical alignment between the wafer-scale lenses 110 and 120 or between the wafer-scale lens 120 and the image sensor 150 may be inaccurate due to the thickness of the adhesive, that is, accuracy in vertical alignment of the wafer-scale lenses 110 and 120 to the image sensor 150 may be lowered due to the adhesive.

In order to avoid such deterioration in vertical alignment due to adhesive, grooves G may be engraved at a predetermined depth in the contact planes between the spacers 130 and substrates (112, 122) or between the spacers 130 and glass cover 140. FIG. 2 shows an example where grooves G are engraved in the spacers 130, however, this is only illustrative. For example, it is also possible that grooves G are engraved in the substrates 112 and 122 or in the glass cover 140 instead of in the spacers 130. In the current embodiment, the grooves G are formed in the upper and lower sides of the spacers 130, but this is also only illustrative. For example, it is also possible that grooves G are formed in some of the contact planes of the spacers 130 with the substrates 112 and 112 or the glass cover 140.

Each groove G, which is shown in FIG. 2, may have a one-step structure, however is not limited to this. For example, each groove G may have a two-step structure, which will be described later with reference to FIG. 4. In addition, adhesive 132 is filled in the grooves G in order to bond the spacers 130 with the substrates 112 and 122 and/or the glass cover 140. A method of filling the adhesive 132 into the grooves G is not limited. The volume of adhesive 132 applied in each groove G may be less than the volume of the groove G in order to prevent leakage of the adhesive 132 that influences vertical alignment.

The wafer-scale lenses 110 and 120 include the substrates 112 and 122, respectively, and include lens elements 114, 116 and 124 formed on one side or both sides of each of the substrates 112 and 122. The lens elements 114, 116 and 124 may be glass lens elements made of a glass material or may be polymer lens elements made of UV-curable polymer, etc. Alternatively, some of the lens elements 114, 116 and 124 may be glass lens elements and the remaining lens element(s) may be polymer lens elements.

At least one of the lens elements 114, 116 and 124 may be manufactured as a separate lens product. The lens product is produced with glass, polymer, etc. and then properly positioned and fixed on the substrate 112 or 122 according to the above-described process for arranging and fixing lens elements. Meanwhile, the other lens elements except for the lens product may be pasted with UV curable polymer directly on the substrates 112 or 122 according to an existing method or may be manufactured by polymer replication and the like. According to the current embodiment, various methods may be adopted to parallel-align the lens elements 114, 116 and 124 as separate products on the substrates 112 and 122 and achieve accurate positioning and vertical alignment.

Figure 3A:
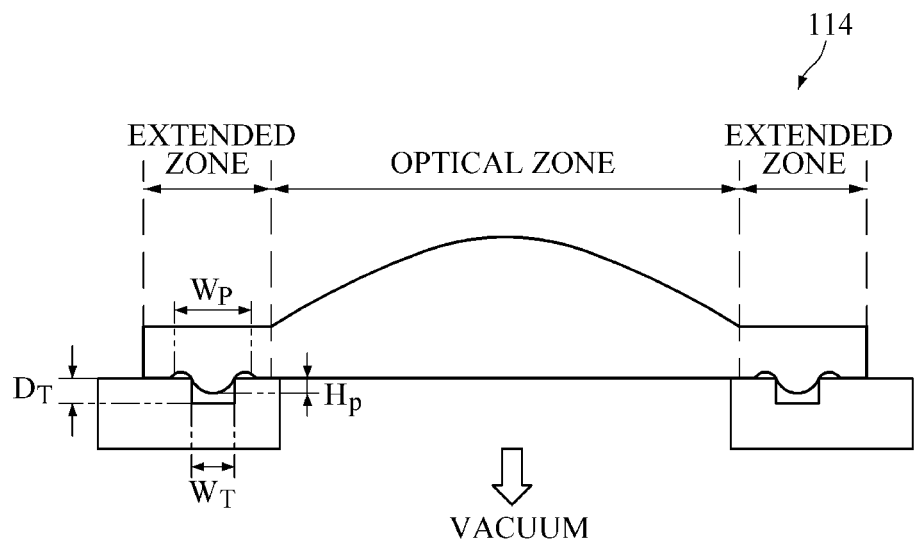
FIGS. 3A and 3B illustrate lens elements and substrates manufactured as separate products.
Figure 3B:
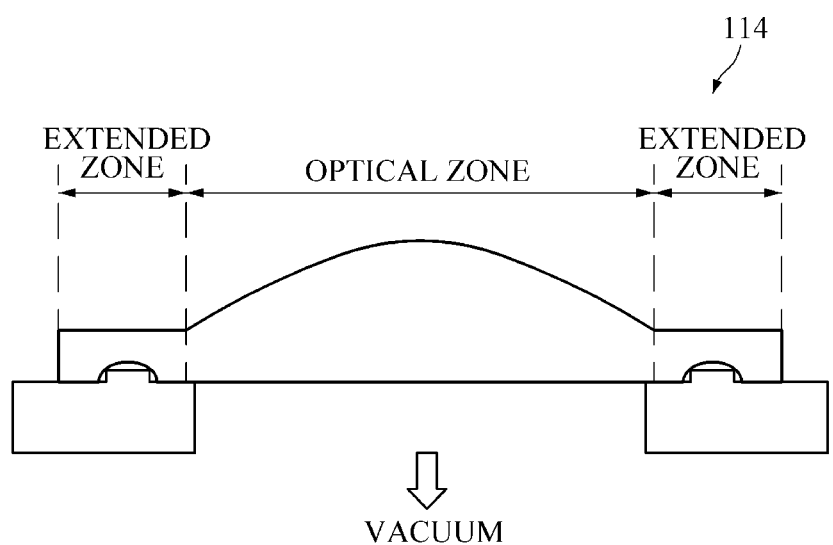

FIGS. 3A and 3B illustrate lens elements and substrates manufactured as separate products. FIG. 3A shows an example where a protrusion is formed in a lens element and a trench corresponding to the protrusion is formed in a substrate such that the protrusion and trench act as a pair of alignment guides, and FIG. 3B shows an example where a protrusion is formed in a substrate and a trench corresponding to the protrusion is formed in a lens element such that the protrusion and trench act as a pair of alignment guides.

Referring to FIG. 3A, the lens element includes an optical zone and an extended zone. The optical zone corresponds to the mean effective area of the lens element and is a part through which light passes. The shape of the optical zone is not limited and may be flat, concave, convex or curved with points of inflection. The optical zone may offer one or two lens planes.

The extended zone is a part which extends from the optical zone to fix the lens element on the substrate. That is, the extended zone is the remaining part of the lens element except for the optical zone. On one surface (more exactly, a surface contacting the substrate) of the extended zone, a protrusion P is formed as an alignment guide. In the embodiment of FIG. 3B, a trench is formed as an alignment guide in an extended zone of a lens element. The protrusion P may be disposed outside the optical zone, spaced a predetermined distance from the edge portion of the optical zone. The peripheral areas Ip of the protrusion P may be recessed a predetermined depth from the protrusion P. In this case, it is possible to make no flat interface or only minimal flat interface formed between the lens element and the substrate so that no adhesive is needed between the lens element and the substrate. Also, by carrying out the manufacturing process under a vacuum condition, the lens element may be adhered closer to the substrate and fixed completely using predetermined assembling means, which will be described later.

The protrusion P is positioned in correspondence to the trench (simply, denoted by "T") formed in the substrate. The height Hp of the protrusion P is equal to or lower than the depth $D_T$ of the trench T of the substrate, and the width $W_p$ of the protrusion P is equal to or wider than the width $W_T$ of the trench T. Since the width $W_P$ of the protrusion P is equal to or wider than the width $W_T$ of the trench and the height $H_P$ of the protrusion P is equal to or less than the depth $D_T$ of the trench T, the inclined portion (the curved plane) of the protrusion P of the lens element comes in contact with corners of the trench T, so that the lens element may be arranged in parallel to the substrate without moving freely on the substrate. In addition, by matching the center of the lens element with the center of the trench (T) pattern circle formed along the edge portion of the substrate or with the center of the protrusion (P) pattern circle formed along the edge portion of the lens element, accuracy in positional alignment of the lens element may be improved.

According to an aspect of the current embodiment, the peripheral areas Ip of the protrusion P may be flat. The flat peripheral areas Ip of the protrusion P form a horizontal interface with the substrate when the protrusion P of the lens element is settled in the trench of the substrate. The horizontal interface acts to prevent the lens element from moving freely on the substrate during the manufacturing process by increasing frictional force between the substrate and the lens element. It is not necessary to apply adhesive on the horizontal interface so as to horizontally align and fix the lens element on the substrate. This may also prevent the height of the lens element relative to the substrate from increasing due to application of such adhesive.

The substrates 112 and 122 (see FIG. 2) are respectively divided into light-transmission parts 112a and 122a through which incident light can pass and their peripheral areas 112b and 122b. The light-transmission parts 112a and 122a, which correspond to optical zones of the lens elements 114, 116 and 124, may be formed in a circle or polygon form, in the middle areas of the substrates 112 and 122. The peripheral areas 112b and 122b are the areas located outside the light-transmission parts 112a and 122a respectively of the substrates 112 and 122. If the light-transmission parts 112a and 122a are through holes, the light-transmission parts 112a and 122a are defined by the peripheral areas 112b and 122b. The substrates 112 and 122 may be transparent substrates such as glass substrates, or opaque substrates. If the substrates 112 and 122 are transparent substrates, the light-transmission parts 112a and 122a may be defined by opaque aperture stops (not shown) surrounding the edge portions of each of the light-transmission parts 112a and 122a. That is, in the case where the substrates 112 and 122 are transparent substrates, a through hole penetrating each substrate is not an essential element to define the light-transmission part of the substrate. Meanwhile, if the substrates 112 and 122 are opaque substrates, as illustrated in FIG. 2, the light-transmission parts 112a and 122a of the substrates 112 and 122 are through holes that penetrate the substrates 112 and 122.

A trench or groove is formed in one side or both sides of each of the peripheral areas 112b and 122b. In the embodiment shown in FIG. 3B, a protrusion is formed as an alignment guide around the peripheral area of a substrate. Again referring to FIG. 2, trenches T1, T2 and T3 are formed in a continuous or discontinuous line adjacent to the edge portions of the light-transmission parts 112a and 122a, specifically, in the peripheral areas 112b and 122b of the substrates 112 and 122. As described above, the depths of the respective trenches T1, T2 and T3 may be equal to or greater than the heights of the corresponding protrusions P1, P2 and P3 formed on the lens elements 114, 116 and 124. Also, the widths of the trenches T1, T2 and T3 may be equal to or narrower than the widths of some portions of the corresponding protrusions P1, P2 and P3.

The trenches T1, T2 and T3 provide spaces to accommodate the protrusions P1, P2 and P3 therein, respectively. In summary, utilizing structural interrelationships between the trenches T1, T2 and T3 of the substrates 112 and 122 and the protrusions P1, P2 and P3 of the lens elements 114, 116 and 124, along with contacts between the inclined portions of the protrusions P1, P2 and P3 and the corners of the trenches T1, T2 and T3, facilitates accurate alignment of the lens elements 114, 116 and 124 on the substrates 112 and 122 while preventing the lens elements 114, 116 and 124 from moving freely on the substrates 112 and 122 during manufacture. In this way, by arranging the lens elements 114, 116 and 124 at exact positions on the substrates 112 and 122, accuracy in positional alignment between the lens elements 114, 116 and 124 having a stacked structure is improved.

The trenches T1, T2 and T3 may be, as illustrated in FIG. 2, 3A or 3B, one-step trenches. The trenches T1, T2 and T3 do not need to be all the same in shape, size and spacing from the light-transmission parts 112a and 122a, and may have different shapes, sizes, etc. depending on the shapes, sizes, etc. of the corresponding lens element protrusions P1, P2 and P3. As described above, the depths of the trenches T1, T2 and T3 may be set to be equal to or greater than the heights $H_T$ (see FIG. 3A) of the corresponding protrusions P1, P2 and P3, respectively, so that some portions of the protrusions P1, P2 and P3 can be inserted into the trenches T1, T2 and T3 while contacting the substrates 112 and 122.

Figure 4:
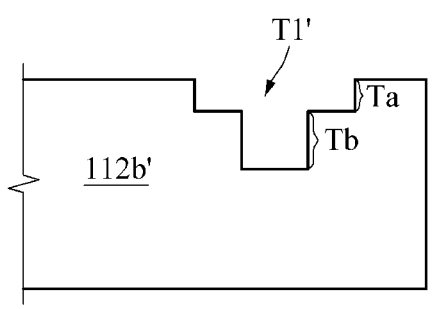
FIG. 4 is a view for explaining a 2-step trench structure.

Alternatively, all or some of the trenches T1, T2 and T3 may be two-step trenches. FIG. 4 is a view for explaining a 2-step trench structure, and shows a two-step trench T1' formed in a peripheral area 112b' of the substrate 112 (see FIG. 2). Referring to FIG. 4, the two-step trench T1' is composed of a first trench Ta being relatively wide and a relatively shallow, and a second trench Tb formed in the middle of the first trench Ta and being relatively narrow and relatively deep. The two-step trench T1' facilitates, in addition to offering a sufficient space into which the protrusion P1 of the lens element 114 can be inserted, accurate vertical alignment of the lens element 114, which will be described later.

Returning again to FIG. 2, the image pickup apparatus may further include assembling means for fixing the lens elements 114, 116 and 124 on the substrates 112 and 122. A method of attaching and fixing lens elements on substrates using adhesive has been used. However, according to the current embodiment, no adhesive is used in the interfaces between the lens elements 114, 116 and 124 and substrates 112 and 122, particularly, in the interfaces on which the protrusions P1, P2 and P3 contact the trenches T1, T2 and T3. Instead, different assembling means, which will be described later, are used in the interfaces to fix the lens elements 114, 116 and 124 on the substrates 112 and 122.

If there is adhesive in the interfaces between the substrates 112 and 122 and lens elements 114, 116 and 124, when the adhesive is partially unevenly applied or when non-uniform pressure is applied to the lens elements 114, 116 and 124 upon assembling, the lens elements 114, 116 and 124 may not be aligned properly to the substrates 112 and 122 with respect to the horizontal axis. Particularly, in the case of a large-sized wafer, there is a high possibility that horizontal alignment of lens elements is more significantly affected due to wafer deflection. Furthermore, since the heights of lens elements to substrates also may depend on the presence or amount of adhesive, use of adhesive makes accurate height alignment of the lens elements difficult. In a wafer-level lens module where lens elements are stacked, the heights of the lens elements function as heights and distances on an optical path and accordingly may greatly influence the performance of the wafer-level lens module. For these reasons, the image pickup apparatus according to the current embodiment uses no adhesive in the contact interfaces between the protrusions of the lens elements 114, 116 and 124 and the trenches of the substrates 112 and 122.

As described above, according to the current embodiment, the lens elements 114, 116 and 124 contact the substrates 112 and 122 through protrusions and trenches. Here, a contact angle θ of the lens elements 114, 116 and 124 to the substrates 112 and 122 is a design factor which will be set in consideration of easiness of alignment, adjustment of assembly height, etc. For example, if the contact angle θ is high, alignment is easy but the finally assembled structure may show relatively different heights in some areas due to differences in width or curved shape of the trenches. Also, the contact angle θ may depend on the shapes, sizes, etc. of the trenches and protrusions, and therefore, the contact angle θ is not limited to a specific value.

Moreover, the structure where the lens elements are aligned to the substrates by making the inclined portions of protrusions contact the corners of trenches improves accuracy of alignment in wafer-level manufacturing. In order to align lens elements onto a plurality of substrates that are partitioned into an array on a wafer, only applying slight vibration to the wafer on which the lens elements are placed is sufficient. Due to the slight vibration, the lens elements are aligned at exact positions on the substrates by the structural correspondence relationship of alignment guides that are formed in pairs in the lens elements and substrates. In other words, by centering by way of making inclined surfaces of protrusions contact corners of trenches, the lens elements are aligned at exact positions on the substrates. In addition, by friction force that arises between the inclined surfaces and corners, the lens elements are firmly fixed onto the substrates. Also, after the alignment is made, by pulling lenses using vacuum force, it is possible to prevent the alignment of the lens elements from being tilted during manufacturing.

Figure 5A:
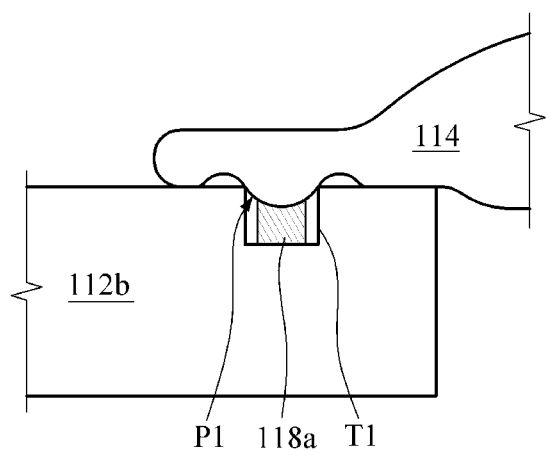
FIGS. 5A and 5B show examples where adhesive applied inside trenches is used as assembling means, wherein FIG. 5A corresponds to the case where a one-step trench is formed in a substrate and FIG. 5B corresponds to the case where a two-step trench is formed in a substrate.
Figure 5B:
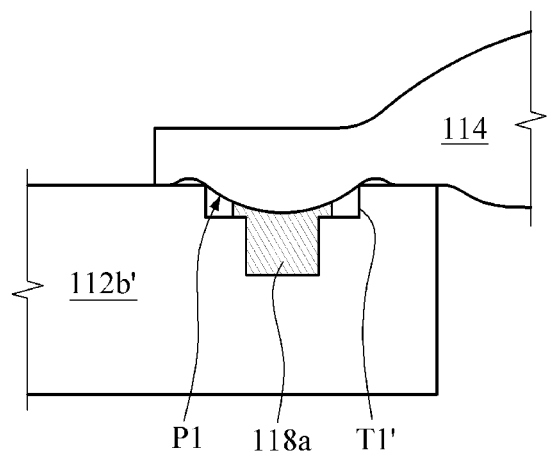

FIGS. 5A and 5B show examples where adhesive 118*a* applied inside trenches (T1, T1') is used as assembling means, wherein FIG. 5A corresponds to the case where a one-step trench T1 is formed in a substrate area 112*b* and FIG. 5B corresponds to the case where a two-step trench T1' is formed in a substrate area 112*b*'. Referring to FIGS. 5A and 5B, the amount of adhesive 118*a* applied in the trench T1 or T1' is less than the volume of the trench T1 or T1'. Here, the amount of the adhesive 118*a* may be less than a volume resulting from subtracting the volume of a protrusion P1 (more exactly, a protrusion (P1) part inserted into the trench T1 or T1') from the trench volume.

The relationship between the adhesive 118 and the trench/protrusion volume allows a lens element 114 to be fixed onto the substrate area 112*b* or 112*b*' only through the protrusion (P1), and prevents the adhesive 118*a* from flowing over the horizontal interface between the lens element 114 and the substrate area 112*b* or 112*b*' upon bonding. Furthermore, as illustrated in FIG. 5B, in the case of the two-step trench T1', a first trench having a relatively wide width and a relatively shallow depth acts as a buffer when the lens element 114 is fixed onto the substrate area 112*b*', thus more efficiently preventing the adhesive 118*a* from overflowing outside the trench T1'.

The adhesive 118*a* may be applied into the trench T1 or T1' before the lens element 114 is aligned on the substrate area 112*b*. In this case, self-alignment (aligning lens elements by applying vibration to a wafer) of the lens element 114 may be difficult. For self-alignment of lens elements, adhesive may be applied, after aligning lens elements, into trenches. For example, it is possible that a passage is formed from each trench to the outside and adhesive is injected into the trench through the passage using a capillary phenomenon.

FIGS. 6A through 6D show other examples where assembling means 118*b* through 118*e* are applied on substrates and lens elements.

Figure 6A:
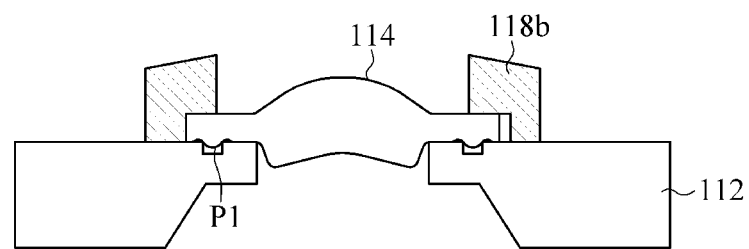
FIGS. 6A through 6D show other examples where assembling means are applied on substrates and lens elements.
Figure 6B:
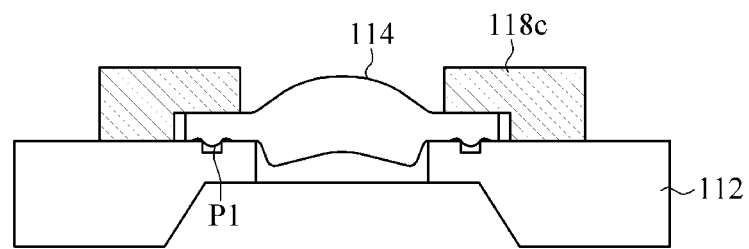

Referring to FIGS. 6A and 6B, the assembling means 118*b* and 118*c* are provided as material film patterns that extend over a part of an extended zone of a lens element 114 and a part of a peripheral area of a substrate 112. The upper surface of the extended zone of the lens element 114 corresponds to an opposite side of a protrusion P1 formed on the lower surface of the lens element 114. The material film patterns may be photoresist patterns (118*b* of FIG. 6A) or elastic material patterns (118*c* of FIG. 6B). The photoresist patterns may be formed using a general photoresist patterning process. In this case, a photoresist layer may be applied on the entire surface of a wafer and then exposure and development may be performed, or a photoresist layer may be partially formed using a predetermined mask pattern and the like and then exposure and development may be performed. In the latter case, unnecessary application of photoresist can be avoided, which leads to a reduction in manufacturing costs.

Generally, the photoresist pattern 118*b* is easily formed in a desired pattern, and during the formation of the photoresist pattern 118*b*, damage on the surface of the lens element 114 can be minimized. Also, the elastic material pattern 118*c* may be formed using molding and the like. In order to maintain the alignment of the lens element 114 and ensure a close contact between the lens element 114 and the substrate 112 while forming the material film pattern 118*b* or 118*c* with photoresist or plastic, etc., vacuum suction force may be applied while forming the material film pattern 118*b* or 118*c*.

Figure 6C:
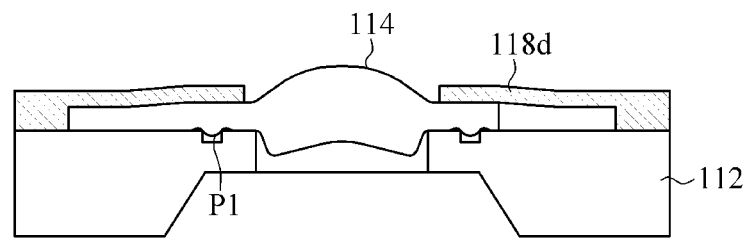
Figure 6D:
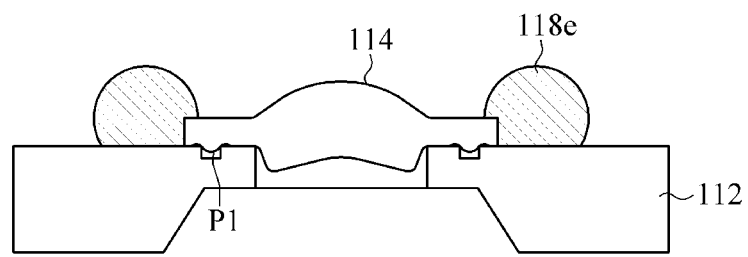

Referring to FIG. 6C, the assembling means 118*d* may be an elastic structure whose one edge portion fixes the upper surface of the extended zone of the lens element 114. The elastic structure 118*d* may be made of a soft material or include a soft substance at an area to contact the lens element 114 in order to prevent the lens element 114 from being damaged. The other edge portion of the elastic structure 118*d* may be fixed on the peripheral area of the substrate 112 or at spacers, etc. formed along the edge portion of the substrate 112. Likewise, vacuum suction force may be applied to maintain a close contact between the lens element 114 and the substrate 112 temporarily until the elastic structure 118d is completely formed. Referring to FIG. 6D, the assembling means 118e may be made of a thermosetting material and/or a UV curable adhesive. In more detail, the lens element 114 may be fixed on the substrate 112 by applying adhesive over parts of the extended zone of the lens element 114 and the peripheral area of the substrate 112 and then hardening the adhesive using heat or UV. In this case, likewise, vacuum suction force may be applied to maintain a close contact between the lens element 114 and the substrate 112 temporarily until the adhesive is completely hardened.

Figure 7A:
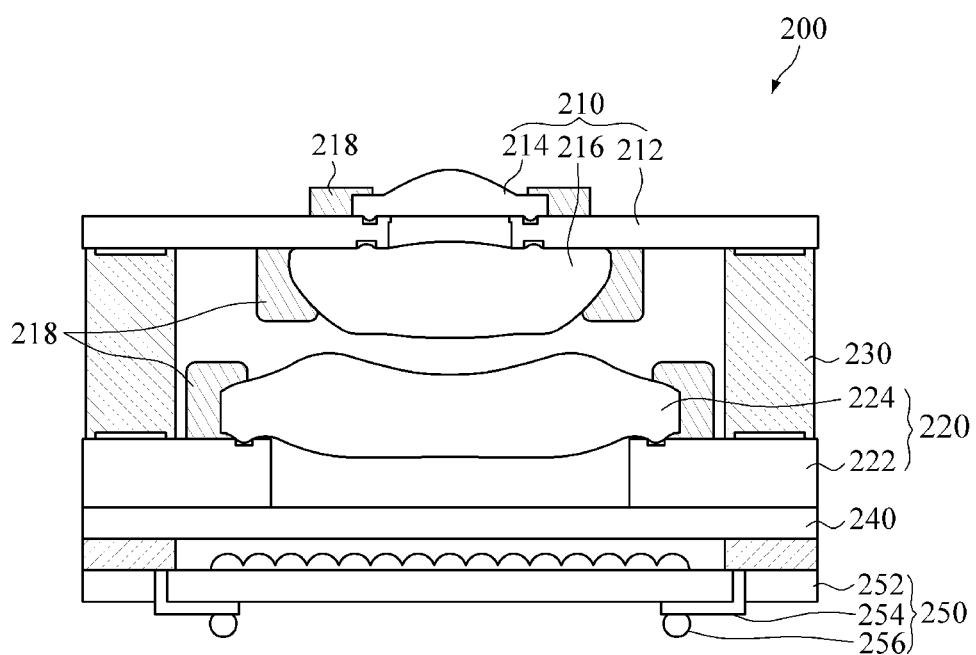
FIGS. 7A and 7B are cross-sectional views of the wafer-level image pickup device cut along a line X-X' of FIG. 1, according to other embodiments.

FIG. 7A is a cross-sectional view of the wafer-level image pickup device 200 cut along a line X-X' of FIG. 1, according to another embodiment. Referring to FIG. 7A, the image pickup device 200 includes a plurality of wafer-scale lenses 210 and 220, spacers 230 and an image sensor 250 covered by a glass cover 240. The following description will be given based on differences between the embodiments of FIGS. 2 and 7A, and details omitted in the following description will be understood from the above description given with reference to FIG. 2. Like the embodiment of FIG. 2, the current embodiment also relates to an example where a pair of alignment guides are provided including a protrusion formed in the extended zone of a lens element and a trench formed in the peripheral area of a substrate, wherein it is also possible to form a trench in the extended zone of the lens element and a protrusion in the peripheral area of the substrate.

Referring to FIG. 7A, the wafer-scale lenses 210 and 220 include substrates 212 and 222 spaced a predetermined distance apart from each other by the spacers 230, lens elements 214, 216 and 224 formed on one side or both sides of the substrates 212 and 222, and photoresist patterns 218 for fixing the lens elements 214, 216 and 224 on the substrates 212 and 222, respectively. Some or all of the lens elements 214, 216 and 224 may be separate glass lens products or separate polymer lens products. The lens elements 214, 216 and 224 each includes an optical zone and an extended zone. A protrusion is formed on one side of the extended zone. The substrates 212 and 222 each includes a light-transmission part and a peripheral area, and the light-transmission part may be a through hole that is defined by the peripheral area. On one side or both sides of each of the substrates 212 and 222, a one-step or two-step trench is formed. In the current embodiment, a photoresist pattern is used as assembling means to fix the lens elements 214, 216 and 224 on the substrates 212 and 222 (see FIG. 6A).

Figure 7B:
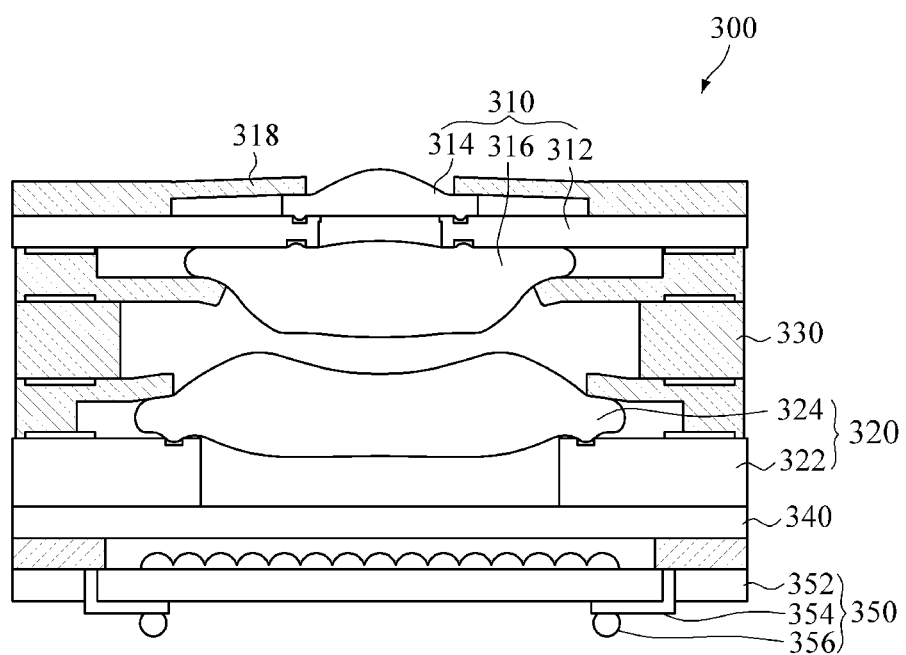

FIG. 7B is a cross-sectional view of the wafer-level image pickup device 300 cut along the line X-X' of FIG. 1, according to another embodiment. Referring to FIG. 7B, the image pickup device 300 includes a plurality of wafer-scale lenses 310 and 320, spacers 330 and an image sensor 350 covered by a glass cover 340. The following description will be given based on differences between the embodiments of FIGS. 2 and 7B, and details omitted in the following description will be understood from the above description given with reference to FIG. 2. Like the embodiment of FIG. 2, the current embodiment also relates to an example where a pair of alignment guides are provided including a protrusion formed in the extended zone of a lens element and a trench formed in the peripheral area of a substrate, wherein it is also possible to form a trench in the extended zone of the lens element and a protrusion in the peripheral area of the substrate.

Referring to FIG. 7B, the wafer-scale lenses 310 and 320 include substrates 312 and 322 spaced a predetermined distance apart from each other by the spacers 330, lens elements 314, 316 and 324 formed on one side or both sides of the substrates 312 and 322, and photoresist patterns 318 for fixing the lens elements 314, 316 and 324 on the substrates 312 and 322, respectively. Some or all of the lens elements 314, 316 and 324 may be separate glass lens products or separate polymer lens products. The lens elements 314, 316 and 324 each includes an optical zone and an extended zone. A protrusion is formed on one side of the extended zone. The substrates 312 and 322 each includes a light-transmission part and a peripheral area, and the light-transmission part may be a through hole that is defined by the peripheral area. On one side or both sides of each of the substrates 312 and 322, a one-step or two-step trench is formed. In the current embodiment, an elastic structure is used as assembling means to fix the lens elements 314, 316 and 324 on the substrates 312 and 322 (see FIG. 6C).

Figure 8:
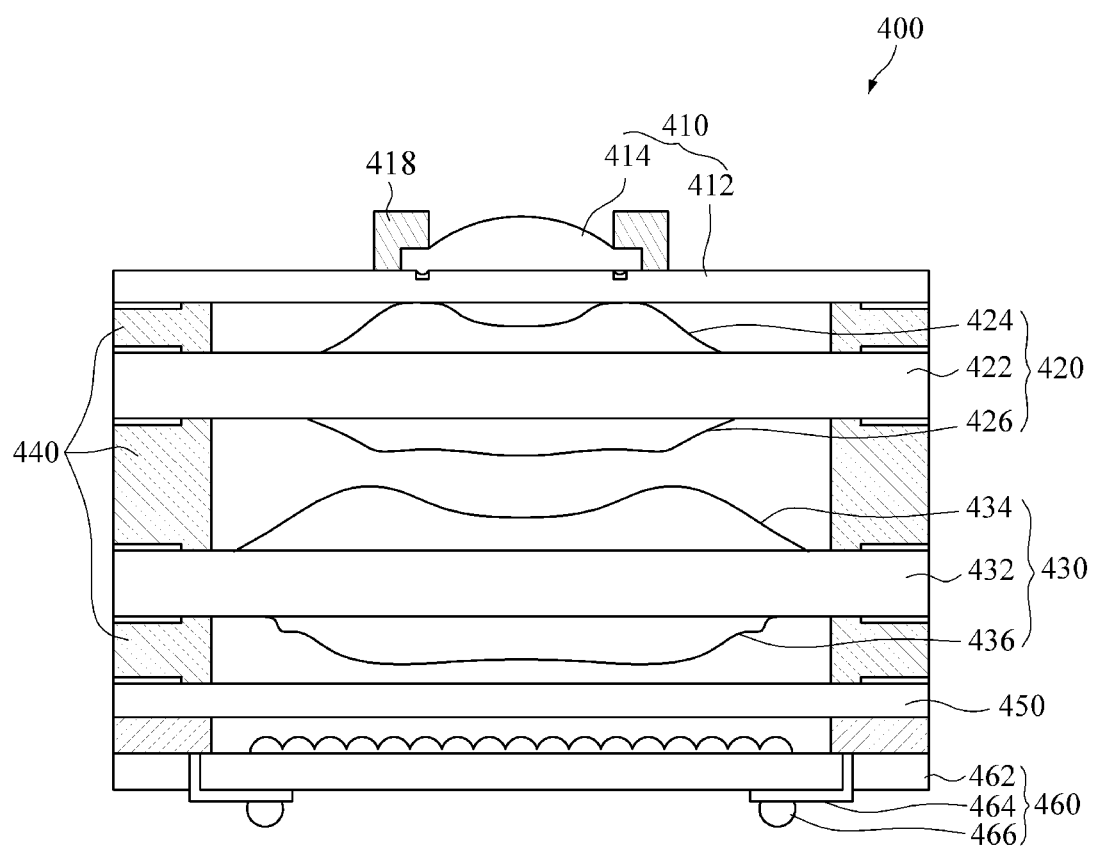
FIG. 8 is a cross-sectional view of another wafer-level image pickup device.

FIG. 8 is a cross-sectional view of another wafer-level image pickup device 400. Referring to FIG. 8, the image pickup device 400 includes a plurality of wafer-scale lenses 410, 420 and 430, spacers 440 and an image sensor 460 covered by a glass cover 450. The embodiment of FIG. 8 is different from the above-described embodiments in that in only the first wafer-scale lens 410 of the three wafer-scale lenses 410, 420 and 430, a pair of alignment guides are provided to align and fix a lens element on a substrate and the other wafer-scale lens 420 and 430 are wafer-scale lenses manufactured by a conventional method (for example, polymer replication). The following description will be given based on differences between the embodiments of FIGS. 2 and 8, and details omitted in the following description will be understood from the above description given with reference to FIG. 2. In the current embodiment, in the first wafer-scale lens 410, a pair of alignment guides are provided including a protrusion formed in the extended zone of a lens element and a trench formed in the peripheral area of a substrate. It is also possible to form a trench in the extended zone of the lens element and a protrusion in the peripheral area of the substrate.

Referring to FIG. 8, the wafer-scale lenses 410, 420 and 430 include substrates 412, 422 and 432 spaced a predetermined distance apart from each other by the spacers 440, and lens elements 414, 424, 426, 434 and 436 formed on one side or both sides of the substrates 412, 422 and 432, respectively. The first wafer-scale lens 410 includes a photoresist pattern 418 for fixing the lens element 414 on the substrate 412. The lens element 414 may be a separate glass lens or a separate polymer lens. The lens element 414 consists of an optical zone and an extended zone, and a protrusion (or a trench) is formed on one side of the extended zone. The substrate 412 includes a light-transmission part and a peripheral area, and the light-transmission part may be a through hole that is defined by the peripheral area. In addition, a one-step or two-step trench (or a protrusion) is formed in one side or both sides of the peripheral area of the substrate 412. FIG. 8 shows an example where a photoresist pattern is used as assembling means to fix the lens element 414 on the substrate 412, but different types of assembling means may be used as illustrated in FIGS. 6B, 6C and 6D.

The second wafer-scale lens 420 includes the second substrate 422 and a second lens group (424 and 426). The second substrate 422 which is transparent may be made of the same material as the polymer lens elements 424 and 426 belonging to the second lens group, or made of a material with different optical characteristics. The polymer lens elements 424 and 426 are formed on either side (for example, an object-side plane and an image sensor-side plane) of the second substrate 422. The second wafer-scale lens 420 maintains a predetermined distance from the first wafer-scale lens 410 by the spacer 440 formed along the edge portion of the substrate 422.

The third wafer-scale lens 430 includes the third substrate 432 and a third lens group (424 and 426). Likewise, the third substrate 422 which is transparent may be made of the same material as the polymer lens elements 424 and 426 belonging to the third lens group, or made of a material with different optical characteristics. The polymer lens elements 434 and 436 are formed on either side (for example, an object-side plane and a glass cover-side plane) of the third substrate 432. The third wafer-scale lens 430 maintains a predetermined distance from the second wafer-scale lens 420 by the spacer 440 formed along the edge portion of the third substrate 432, and also maintains a predetermined distance from the image sensor 460 by the spacer 440 formed along the edge portion of the glass cover 450.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wafer-scale lens comprising:
   a substrate comprising a light-transmission part and a first alignment guide disposed outside the light-transmission part; and
   a first lens element comprising an optical zone, an extended zone disposed outside the optical zone, and a second alignment guide disposed in the extended zone,
   wherein one of the first alignment guide and the second alignment guide is a trench and another of the first alignment guide and the second alignment guide is a protrusion; and
   wherein the lens element is disposed on the substrate such that the optical zone is aligned with the light-transmission part and the first alignment guide is aligned with the second alignment guide;
   wherein the protrusion comprises a convex portion, which extends within the trench and wherein a portion of the convex portion contacts corners of the trench, and wherein the protrusion further comprises a concave portion laterally disposed with respect to the corners of the trench.

2. The wafer-scale lens of claim 1, wherein there is no adhesive on a contact interface between the extended zone of the first lens element and the substrate.

3. The wafer-scale lens of claim 1, wherein the light-transmission part comprises a through hole which penetrates the substrate.

4. The wafer-scale lens of claim 1, further comprising adhesive, disposed in the trench, which fixes the first lens element on the substrate.

5. The wafer-scale lens of claim 4, wherein the trench comprises a two-step trench.

6. The wafer-scale lens of claim 4, wherein a volume of the trench is greater than a sum of a volume of the adhesive and a volume of a part of the convex portion of the protrusion which extends within the trench.

7. The wafer-scale lens of claim 1, further comprising a material film pattern disposed over an outer edge of the first lens element and a part of the substrate, which fixes the first lens element on the substrate.

8. The wafer-scale lens of claim 7, wherein the material film pattern comprises one of a photoresist, a thermosetting polymer, a UV curable polymer, and an elastic substance.

9. The wafer-scale lens of claim 1, further comprising a mechanical elastic structure which fixes the first lens element on the substrate.

10. The wafer-scale lens of claim 1, wherein the first lens element comprises one of a glass lens product and a polymer lens.

11. The wafer-scale lens of claim 1, wherein the optical zone is a first optical zone and the extended zone is a first extended zone, the wafer-scale lens further comprises:
    a second lens element comprising a second optical zone, a second extended zone disposed outside the second optical zone, and a third alignment guide disposed in the second extended zone,
    wherein a fourth alignment guide disposed on a second side of the substrate, opposite the first side; and
    wherein the first alignment guide is disposed on a first side of the substrate and the substrate further comprises a fourth alignment guide is disposed outside the light transmission part, on a second side of the substrate, opposite the first side,
    wherein one of the third alignment guide and the fourth alignment guide is a trench and another of the third alignment guide and the fourth alignment guide is a protrusion and
    wherein the second lens element is disposed on the second side of the substrate such that the second optical zone of the second lens element is aligned with the light-transmission part and the third alignment guide is aligned with the fourth alignment guide such that an inclined portion of the protrusion contacts corners of the trench.

12. A wafer-level lens module comprising:
    a first wafer-scale lens comprising a first substrate and a first lens element disposed on one side of the first substrate; and
    a second wafer-scale lens, spaced a predetermined distance from the first wafer-scale lens, comprising a second substrate and a second lens element disposed on one side of the second substrate,
    wherein:
    the first substrate comprises a light-transmission part and a first trench disposed outside the light-transmission part,
    the first lens element comprises an optical zone, an extended zone disposed outside the optical zone, and a protrusion disposed in the extended zone,
    the first lens element is disposed on the one side of the first substrate such that the optical zone is aligned with the light-transmission part, and the protrusion is aligned with the first trench; and
    wherein the protrusion comprises a convex portion, which extends within the trench and wherein a portion of the convex portion contacts corners of the trench, and wherein the protrusion further comprises a concave portion laterally disposed with respect to the corners of the trench.

13. The wafer-level lens module of claim 12, further comprising a spacer interposed between the first substrate and the second substrate, which spaces the first wafer-scale lens the predetermined distance from the second wafer-scale lens.

14. The wafer-level lens module of claim 12, wherein
    the spacer comprises a groove is engraved in a side thereof,
    the spacer is fixed with the first substrate and/or the second substrate by adhesive disposed in the groove, and a volume of the adhesive is less than a volume of the groove.

15. The wafer-level lens module of claim 12, wherein the light-transmission comprises a first through hole which penetrates the first substrate.

16. The wafer-level lens module of claim 12, further comprising a material film pattern disposed over an outer edge of the first lens element and a part of the first substrate, which fixes the first lens element on the first substrate.

17. The wafer-level lens module of claim 12, wherein the protrusion and the first trench are a pair of alignment guides which are aligned with each other.

18. The wafer-level lens module of claim 12, wherein the second lens element comprises a polymer replication lens.

19. The wafer-level lens module of claim 12,
wherein the second substrate comprises a transparent light-transmission part through, and a second trench disposed in a predetermined area of the second substrate outside the light-transmission part,
the optical zone is a first optical zone and the extended zone is a first extended zone,
the second lens element comprises a second optical zone, a second extended zone disposed outside the second optical zone, and a protrusion disposed in the second extended zone, and
the second lens element is disposed on the one side of the second substrate such that the second optical zone is aligned with the light-transmission part, and the protrusion is aligned with the second trench such that an inclined portion of the protrusion of the second lens element contacts corners of the second trench.

20. The wafer-level lens module of claim 19, wherein
the first wafer-scale lens further includes a third lens element comprising a third optical zone, a third extended zone disposed outside the third optical zone, and a protrusion disposed in the third extended zone,
the first substrate further comprises a third trench disposed outside the light-transmission part on a second side of the first substrate, opposite the one side, and
the third lens element is disposed on the second side of the first substrate such that the third optical zone of the third lens element is aligned with the light-transmission part and the protrusion of the third lens element is aligned with the third trench such that an inclined portion of the protrusion of the third lens element contacts corners of the third trench.

21. A wafer-scale lens module comprising:
a first substrate comprising a first through hole, a first trench disposed on a first side of the first substrate and adjacent to an edge portion of the first through hole, and a second trench disposed on a second side of the first substrate and adjacent to the edge portion of the first through hole;
a first lens element comprising a first optical zone, a first extended zone disposed outside the first optical zone, and a protrusion disposed in the first extended zone, wherein the first lens element is disposed on the first side of the first substrate such that the first optical zone is aligned with the first through hole and the protrusion of the first lens element is aligned with the first trench such that an inclined portion of the protrusion of the first lens element contacts corners of the first trench;
a second lens element comprising a second optical zone, a second extended zone disposed outside the second optical zone, and a protrusion disposed in the second extended zone, wherein the second lens element is disposed on the second side of the first substrate such that the second optical zone is aligned with the first through hole and the protrusion of the second lens element is aligned with the second trench such that an inclined portion of the protrusion of the second lens element contacts corners of the second trench;
a second substrate comprising a second through hole and a third trench disposed on a first side of the second substrate and adjacent to an edge portion of the second through hole; and
a third lens element comprising a third optical zone, a third extended zone disposed outside the third optical zone, and a protrusion disposed in the third extended zone, wherein the third lens element is disposed on the first side of the second substrate such that the third optical zone is aligned with the second through hole and the protrusion of the third lens element is aligned with the third trench such that an inclined portion of the protrusion of the third lens element contacts corners of the third trench.

22. An image pickup device comprising:
a first substrate comprising a first through hole, a first trench disposed on a first side of the first substrate and adjacent to an edge portion of the first through hole, and a second trench disposed on a second side of the first substrate and adjacent to the edge portion of the first through hole;
a first lens element comprising a first optical zone, a first extended zone disposed outside the first optical zone, and a protrusion disposed in the first extended zone, wherein the first lens element is disposed on the first side of the first substrate such that the first optical zone is aligned with the first through hole and the protrusion of the first lens element is aligned with the first trench such that an inclined portion of the protrusion of the first lens element contacts corners of the first trench;
a second lens element comprising a second optical zone, a second extended zone disposed outside the second optical zone, and a protrusion disposed in the second extended zone, wherein the second lens element is disposed on the second side of the first substrate such that the second optical zone is aligned with the first through hole and the protrusion of the second lens element is aligned with the second trench such that an inclined portion of the protrusion of the second lens element contacts corners of the second trench;
a second substrate comprising a second through hole and a third trench disposed on a first side of the second substrate and adjacent to an edge portion of the second through hole;
a third lens element comprising a third optical zone, a third extended zone disposed outside the third optical zone, and a protrusion disposed in the third extended zone, wherein the third lens element is disposed on the first side of the second substrate such that the third optical zone is aligned with the second through hole and the protrusion of the third lens element is aligned with the third trench such that an inclined portion of the protrusion of the third lens element contacts corners of the third trench;
an image sensor which senses images received through the third lens element; and
at least one spacer interposed along an edge portion between the first substrate and the second substrate, which spaces the first substrate a predetermined distance from the second substrate.

23. A wafer-scale lens of an image pickup device comprising:

a substrate comprising a light-transmission part and a first alignment guide disposed outside the light-transmission port; and a first lens element comprising an optical zone, an extended zone disposed outside the optical zone, and a second alignment guide disposed in the extended zone, wherein one of the first alignment guide and the second alignment guide is a trench and another of the first alignment guide and the second alignment guide is a protrusion;

wherein the first lens element is disposed on the substrate such that the optical zone is aligned with the light-transmission part and the first alignment guide is aligned with the second alignment guide;

wherein the protrusion comprises a convex portion, which extends within the trench and wherein a portion of the convex portion contacts corners of the trench, and wherein the protrusion further comprises a concave portion laterally disposed with respect to the corners of the trench; and wherein the optical zone, the extended zone, and the second alignment guide are formed as a single body.

24. A wafer-level lens module of an image pickup device comprising:

a first wafer-scale lens comprising a first substrate and a first lens element disposed on one side of the first substrate; and a second wafer-scale lens, spaced a predetermined distance from the first wafer-scale lens, comprising a second substrate and a second lens element disposed on one side of the second substrate;

wherein:

the first substrate comprises a light-transmission part and a first trench disposed outside the light-transmission part, the first lens element comprises an optical zone, an extended zone disposed outside the optical zone, and a protrusion disposed in the extended zone, the first lens element is disposed on the one side of the first substrate such that the optical zone is aligned with the light-transmission part, and the protrusion is aligned with the first trench, wherein the protrusion comprises a convex portion, which extends within the trench and wherein a portion of the convex portion contacts corners of the trench, and wherein the protrusion further comprises a concave portion laterally disposed with respect to the corners of the trench, and the optical zone, the extended zone, and the second alignment guide are formed as a single body.

* * * * *